Sept. 18, 1923. 1,468,040
P. C. SMITH
LUBRICATION COUPLING
Filed Nov. 16, 1921
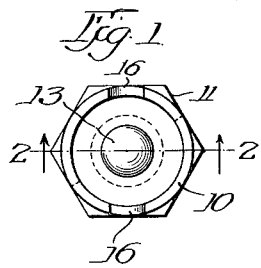
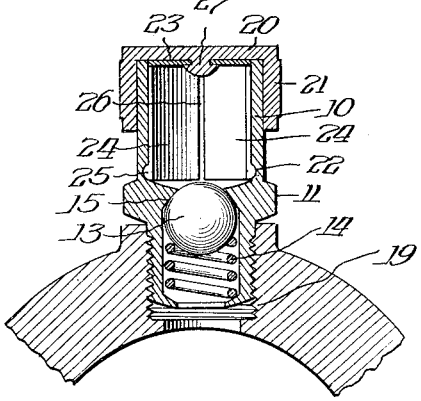
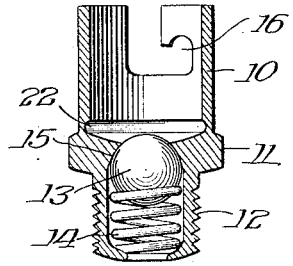
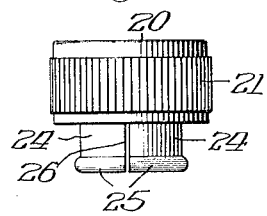
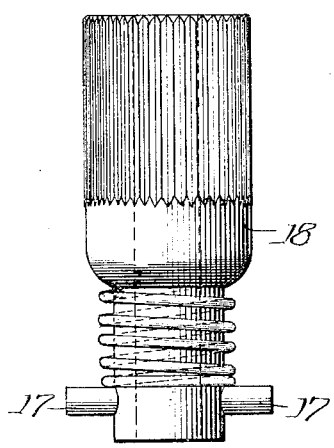
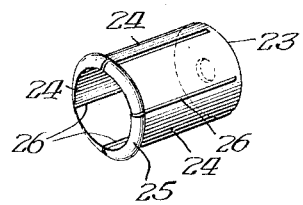
Witness:
Fred C. Lawson
Inventor:
Perry C. Smith,
By Samuel N. Pond,
Atty.

Patented Sept. 18, 1923.

1,468,040

UNITED STATES PATENT OFFICE.

PERRY C. SMITH, OF CHICAGO, ILLINOIS.

LUBRICATION COUPLING.

Application filed November 16, 1921. Serial No. 515,495.

*To all whom it may concern:*

Be it known that I, PERRY C. SMITH, a citizen of the United States, residing at Chicago, in the county of Cook and State of Illinois, have invented certain new and useful Improvements in Lubrication Couplings, of which the following is a specification.

This invention relates to an improved lubrication coupling designed to be applied to a bearing after the fashion of an ordinary grease cup, and to receive a cooperating coupling on the end of a grease gun hose, for supplying grease to the bearing. The present invention is a device of the same general character as that disclosed in a prior application filed by me on the 14th day of March, 1921, Serial No. 452,176, and the object of the present invention is to provide an improved and simplified spring lock for removably fastening the cap or cover of the coupling in place.

One embodiment of the invention is illustrated in the accompanying drawing, in which—

Fig. 1 is a top plan view of my improved lubrication coupling, with the cap or cover thereof removed;

Fig. 2 is a vertical section on the line 2—2 of Fig. 1;

Fig. 3 is an elevation of the outer end of the grease gun hose and the hose coupling swiveled thereon;

Fig. 4 is a vertical section of the lubrication coupling mounted on a bearing, and with the cap or cover thereof applied thereto;

Fig. 5 is a detail side elevation of the cap or cover and its spring lock; and

Fig. 6 is a perspective view of the spring locking device detached from the cap or cover.

Referring to the drawing, 10 designates a cylindrical cup-shaped member, the base 11 of which is formed as a hexagonal nut. Depending from the base 11 is a threaded stem or shank 12, made hollow to form a grease duct and a chamber for a ball valve 13 and valve closing spring 14. In the base of the cup is a central opening 15, the annular wall of which is suitably shaped to constitute a seat for the ball valve 13, as usual. At diametrically opposite points in the cylindrical wall of the body member 10 are a pair of bayonet slots 16. These slots are designed to interlock with a pair of lateral pins or studs 17 (Fig. 3) formed on a cooperating coupling member 18 that is swiveled on the outer end of a grease gun hose (not shown.)

The threaded stem 12 is mounted in a tapped socket 19 of the bearing as shown in Fig. 4, and is designed to be carried by the latter after the fashion of an ordinary grease cup. To protect the bearing against the admission of dust and dirt, I employ a closure member which comprises a cap 20 formed with a depending skirt or sleeve 21 that fits down over the body 10 of the coupling sufficiently to cover the bayonet slots 16 and is preferably milled, as shown in Fig. 5, to facilitate application and removal.

Referring now to the means for separably locking the cap to the body member of the coupling, the inner wall of the body member is formed with an annular groove or channel 22, preferably at its lower end, and to the underside of the cap 20 is secured a one-piece spring locking device, which is shown in perspective detail in Fig. 6, and consists of a central apertured disc 23, and a plurality of depending spring arms 24 having at their lower ends external ribs 25 which, as the cap is applied, snap into, and interlock with, the groove 22. This locking element is conveniently and preferably made from a hollow cylinder with a head at one end, the cylinder being longitudinally split by kerfs 26, the latter being of sufficient width to allow the free ends of the spring arms 24 to be compressed sufficiently to admit their entrance to the body member 10 of the coupling. The central aperture in the head 23 of the spring locking member is entered over a central stud 27 on the inner surface of the cap 20, which latter is then riveted down, as shown in Fig. 4, permanently and securely attaching the spring to the cap.

The manner of applying and removing the cap, and its self-locking capacity, are obvious from the foregoing description. A slight outward pull on the cap suffices to spring the arms 24 inwardly sufficiently to clear the ribs 25 from the groove 22, and, conversely, the lower sides of the ribs 25 being rounded, the spring is easily forced into the chamber 10, and when the cap is in final position, the ribs snap into the groove and thereby lock the cap against accidental displacement.

I claim:

1. A lubrication coupling, comprising a cup-shaped body formed with an internal annular groove at its bottom and a hollow stem for mounting on a bearing, a cap covering the open end of said body and formed with a depending sleeve telescoping over the external surface of said body, and a spring element for removably locking said cap on said body consisting of a longitudinally split hollow cylinder having at its upper end a head attached to the under side of said cap, and having at its other end transverse ribs adapted to snap into engagement with said groove when said cap is applied.

2. A lubrication coupling, comprising a round cup-shaped body formed with an internal annular groove at its bottom, a hollow stem for mounting on a bearing, and a pair of oppositely disposed bayonet slots in its sides, a cap covering the open end of said body and formed with a central rivet stud on its under side and a depending sleeve encircling and fitting the external surface of said body and covering said slots, and a spring element for removably locking said cap on said body consisting of a longitudinally split hollow cylinder of a size to fit within said cup-shaped body, said split cylinder having at one end a centrally apertured head mounted on said rivet stud and having at its its other end transverse ribs adapted to snap into said groove.

PERRY C. SMITH.